(12) United States Patent
Jeong et al.

(10) Patent No.: US 10,057,520 B2
(45) Date of Patent: Aug. 21, 2018

(54) IMAGE SENSOR, IMAGE ACQUIRING DEVICE COMPRISING SAME, AND PORTABLE TERMINAL COMPRISING THE DEVICE

(71) Applicant: LG INNOTEK CO., LTD., Seoul (KR)

(72) Inventors: Yu Kyeong Jeong, Seoul (KR); Young Seop Moon, Seoul (KR)

(73) Assignee: LG INNOTEK, CO., LTD., Seoul (KR)

( * ) Notice: Subject to any disclaimer, the term of this patent is extended or adjusted under 35 U.S.C. 154(b) by 0 days.

(21) Appl. No.: 15/537,204

(22) PCT Filed: Dec. 17, 2015

(86) PCT No.: PCT/KR2015/013845
§ 371 (c)(1),
(2) Date: Jun. 16, 2017

(87) PCT Pub. No.: WO2016/099165
PCT Pub. Date: Jun. 23, 2016

(65) Prior Publication Data
US 2017/0347046 A1 Nov. 30, 2017

(30) Foreign Application Priority Data
Dec. 18, 2014 (KR) ........................ 10-2014-0183280

(51) Int. Cl.
*H04N 5/369* (2011.01)
*H04N 5/232* (2006.01)

(52) U.S. Cl.
CPC ....... *H04N 5/3696* (2013.01); *H04N 5/23212* (2013.01)

(58) Field of Classification Search
CPC . G02B 7/34; H01L 27/14623; H01L 27/1463; H01L 31/02162; H04N 5/23212
(Continued)

(56) References Cited

U.S. PATENT DOCUMENTS 9,420,164 B1\* 8/2016 Galor Gluskin ... H04N 5/23212
2012/0044406 A1\* 2/2012 Shimoda ................ G02B 7/365
348/345
(Continued)

FOREIGN PATENT DOCUMENTS

KR 10-2013-0043095 4/2013
KR 10-2013-0108253 10/2013
(Continued)

OTHER PUBLICATIONS

International Search Report (with English Translation) and Written Opinion dated Mar. 24, 2016 issued in Application No. PCT/KR2015/013845.

*Primary Examiner* — Trung Diep
(74) *Attorney, Agent, or Firm* — KED & Associates, LLP

(57) ABSTRACT

One embodiment provides an image sensor comprising: a plurality of phase difference detection pixels; and a plurality of image detection pixels disposed in a grid pattern along with the plurality of phase difference detection pixels, wherein the plurality of phase difference detection pixels comprise a first pixel group having a shield area biased toward one side from a line connecting two points facing each other in an oblique direction, and thus focus adjustment accuracy may be increased in a diagonal area in which phase difference detection is difficult.

20 Claims, 15 Drawing Sheets

(58) Field of Classification Search
USPC .......................................................... 348/348
See application file for complete search history.

(56) References Cited

U.S. PATENT DOCUMENTS

| | | | |
|---|---|---|---|
| 2012/0154637 A1* | 6/2012 | Hara | H04N 5/23212 348/239 |
| 2014/0028896 A1* | 1/2014 | Oshima | H04N 5/23212 348/350 |
| 2014/0285706 A1 | 9/2014 | Theuwissen | |
| 2015/0077524 A1* | 3/2015 | Suzuki | H01L 31/02162 348/49 |
| 2016/0337575 A1* | 11/2016 | Akiyama | H04N 9/045 |

FOREIGN PATENT DOCUMENTS

| | | |
|---|---|---|
| KR | 10-2013-0134293 | 12/2013 |
| KR | 10-2014-0050556 | 4/2014 |
| KR | 10-2014-0090548 | 7/2014 |
| WO | WO 2012/053363 | 4/2012 |

\* cited by examiner

IMAGE SENSOR, IMAGE ACQUIRING DEVICE COMPRISING SAME, AND PORTABLE TERMINAL COMPRISING THE DEVICE

CROSS-REFERENCE TO RELATED PATENT APPLICATIONS

This application is a U.S. National Stage Application under 35 U.S.C. § 371 of PCT Application No. PCT/KR2015/013845, filed Dec. 17, 2015, which claims priority to Korean Patent Application No. 10-2014-0183280, filed Dec. 18, 2014, whose entire disclosures are hereby incorporated by reference.

TECHNICAL FIELD

Embodiments relate to an image sensor including a phase difference detection pixel, an image pick-up apparatus including the same, and a portable apparatus including the apparatus.

BACKGROUND ART

As demand for high-quality image acquisition technologies in an image pick-up apparatus such as a camera increases, an auto focus (AF) system has been widely applied to a camera for a portable phone or a small size mobile device as well as a digital camera and an interchangeable lens camera.

An AF system using a phase difference detection method or an AF system using a contrast detection method has mainly been used.

The AF system using the contrast detection method uses a method of extracting high frequency data from image data output from an image sensor and performing AF control to maximize the high frequency data. Contrast AF requires a signal processing circuit therefor but does not require a separate sensor or optical system and, accordingly, an AF system may be advantageously configured at relatively low cost. However, contrast AF is disadvantageous compared with the AF system using the phase difference detection method in terms of low speed and low precision.

The AF system using the phase difference detection method uses a method of detecting a focal point by forming a pair of images via pupil division of an image transmitted through an imaging lens, detecting a phase difference as an interval between the pair of formed images, and determining a location of the imaging lens.

However, an image sensor used in a conventional AF system using a phase difference detection method is limited to a configuration in which phase difference detection pixels are divided in a vertical direction to form symmetrical shield regions.

However, the phase difference detection pixel having a shape of the shield region has a limit in extracting a phase difference of a pair of images generated from an optical image emitted to a diagonal region of the image sensor and there is a problem in that AF performance is degraded in a diagonal region or edge region of the image sensor.

Technical Object

Embodiments are provided to provide an image sensor and an image pick-up apparatus using the same, including phase difference detection pixel groups with different shield regions, in order to enhance accuracy of detecting a phase difference in an entire region of an image sensor.

Technical Solution

An embodiment provides an image sensor including a plurality of phase difference detection pixels, and a plurality of image detection pixels arranged in a lattice pattern along with the plurality of phase difference detection pixels, wherein the plurality of phase difference detection pixels includes a first pixel group having a shield region biased toward one side based on a line connecting two points facing each other in a diagonal direction.

The first pixel group may include a first group pixel having a first shield region biased toward a central side of the image sensor based on a line connecting the two points facing each other in the diagonal direction and a second group pixel having a second shield region biased toward an edge portion of the image sensor based on a line connecting the two points facing each other in the diagonal direction.

The first shield region and the second shield region may have the same area.

The first group pixel and the second group pixel may be arranged neighbored to each other.

The first group and the second group pixel may be arranged neighbored to each other in the diagonal direction of the image sensor.

The line connecting the two points facing each other in the diagonal direction may be a curved line.

The curved line may include a first line defining the first shield region of the first group pixel and a second line defining the second shield region of the second group pixel.

The first line may correspond to a portion of a circumference of a virtual concentric circle based on a center of the image sensor.

A radius of curvature of the virtual concentric circle may be increased toward an edge from the center of the image sensor.

The second line may be symmetrical to the first line based on a diagonal line positioned between the first line and the second line and may have the same radius of curvature as the first line.

The shield region to areas of the plurality of phase difference detection pixels may have a ratio of 0.5 to 0.7.

The lattice pattern may include at least one lattice unit.

The first pixel group may be arranged in a lattice unit on a diagonal line of the image sensor.

The first pixel group may be arranged in a lattice unit containing a point corresponding to an intersection between a diagonal line of the images sensor and a virtual concentric circle based on the center of the image sensor.

The lattice pattern may include first color and second color pixels facing each other in a first diagonal direction, and third color and fourth color pixels facing each other in a second diagonal direction that crosses the first diagonal direction.

Color of each of the first color and second color pixels may be green.

The plurality of phase difference detection pixels may be arranged at locations of the first color and second color pixels.

The plurality of phase difference detection pixels include at least one of a second pixel group having a shield region biased toward one side by vertically dividing a pixel and a third pixel group having a shield region biased toward one side by horizontally dividing a pixel.

The second pixel group may be arranged in a row direction of the image sensor.

The third pixel group may be arranged in a column direction of the image sensor.

The first pixel group may be arranged in the lattice unit on a diagonal direction of the image sensor, the second pixel group is arranged in a row direction in the lattice unit adjacent to a horizontal line passing through the center of the image sensor, and the third pixel group may be arranged in a column direction in the lattice unit adjacent to a vertical line passing through the center of the image sensor.

The image sensor may include a plurality of regions defined by four lines passing through the center of the image sensor, and the plurality of regions may include any one selected from the group including the first pixel group, the second pixel group, and the third pixel group.

Acute angles between two adjacent lines among the four lines may be the same.

A region containing a virtual vertical line passing through the center of the image sensor among the plurality of regions may include a third pixel group.

A region containing a virtual diagonal line passing through the center of the image sensor among the plurality of regions may include a first pixel group.

A region containing a virtual horizontal line passing through the center of the image sensor among the plurality of regions may include a second pixel group.

Another embodiment provides an image pick-up apparatus including an optical unit configured to receive an optical signal, the image sensor configured to generate image information from an optical signal received by the optical unit, an image processor configured to process the image information, and an image output unit configured to display a result of processing of the image processor.

The image pick-up apparatus may further include a driver configured to control the optical unit in response to the image information processed by the image processor.

The image information may be image information for adjustment of a focal point, generated from the plurality of phase difference detection pixels of the image sensor.

Another embodiment provides a portable terminal including an image pick-up apparatus, a display unit configured to display an image acquired by the image pick-up apparatus, and an input unit configured to adjust an operation of the image pick-up apparatus.

Advantageous Effects

As is apparent from the above description, an image sensor according to the embodiments may be configured in such a way that phase difference detection pixels, shield regions of which have different shapes, are optimally arranged and, thus, accuracy of detecting a phase difference in an entire region of an image sensor may be increased and auto focus may be easily adjusted in a desired region in an image pick-up apparatus according to an embodiment.

DESCRIPTION OF DRAWINGS

FIG. 8 is a diagram showing a radius of curvature of a first group pixel included in the image sensor.

FIG. 10 is a diagram showing another embodiment of an image sensor.

BEST MODE

Hereinafter, embodiments will be described in detail with reference to the accompanying drawings, in order to concretely realize the above object.

In the description of the embodiments disclosed here, it will be understood that, the terms "first" and "second" used herein should not be limited by these terms and, when an element is referred to as being formed "on" or "under" another element, it can be directly "on" or "under" the other element or be indirectly formed with intervening one or more elements therebetween. It will also be understood that "on" or "under" the element may be described relative to the drawings.

Elements in the following drawings may be exaggerated, omitted, or schematically illustrated for convenience and clarity of explanation, and the sizes of elements do not completely reflect their actual sizes.

Figure 1:
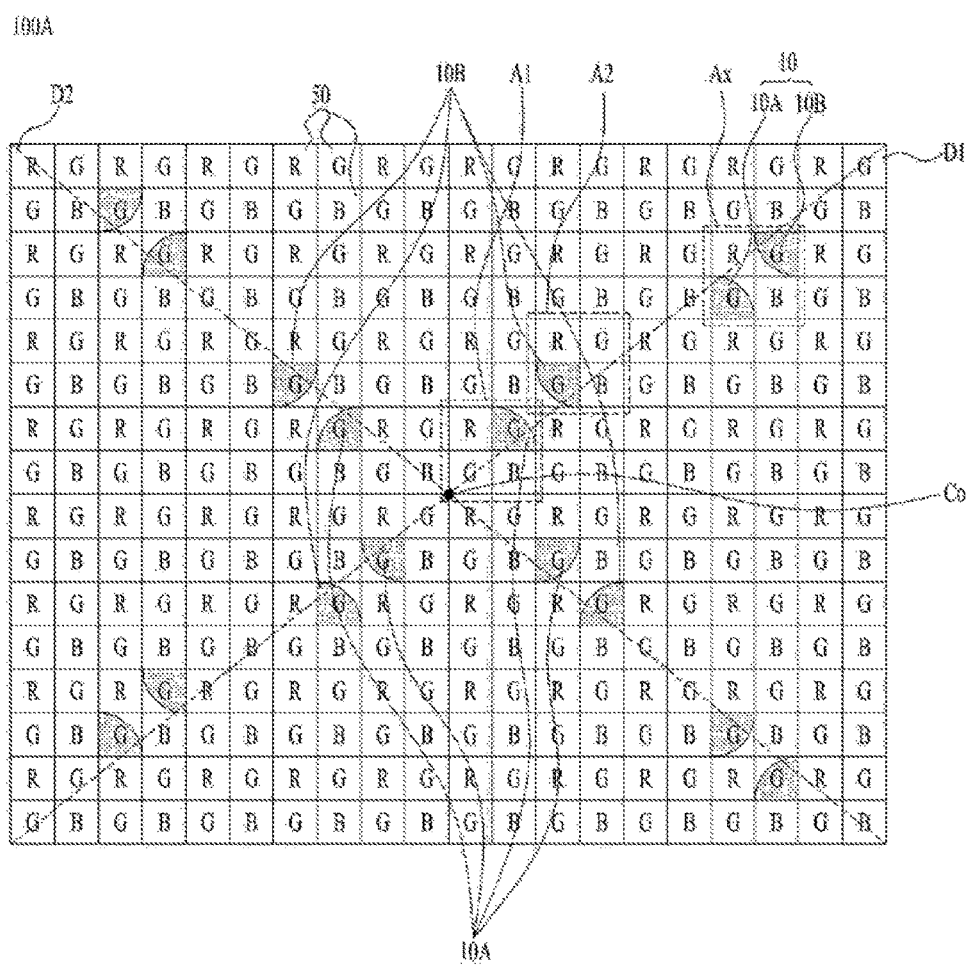
FIG. 1 is a diagram showing an embodiment of an image sensor.

FIG. 1 is a diagram showing an embodiment of an image sensor.

An image sensor 100A according to an embodiment may include a plurality of phase difference detection pixels and a plurality of image detection pixels 50 arranged in a lattice pattern along with the phase difference detection pixels.

In addition, the plurality of phase difference detection pixels may include a first pixel group 10 having a shield region biased toward one side based on a line connecting two opposite points that face each other in a diagonal direction.

The plurality of phase difference detection pixels of the image sensor 100A according to an embodiment may each be a pixel, some regions of which are shielded among regions formed by dividing an opening portion of a pixel and may each have a light receiving region limited by shielding some regions of the opening portion.

Figure 2:
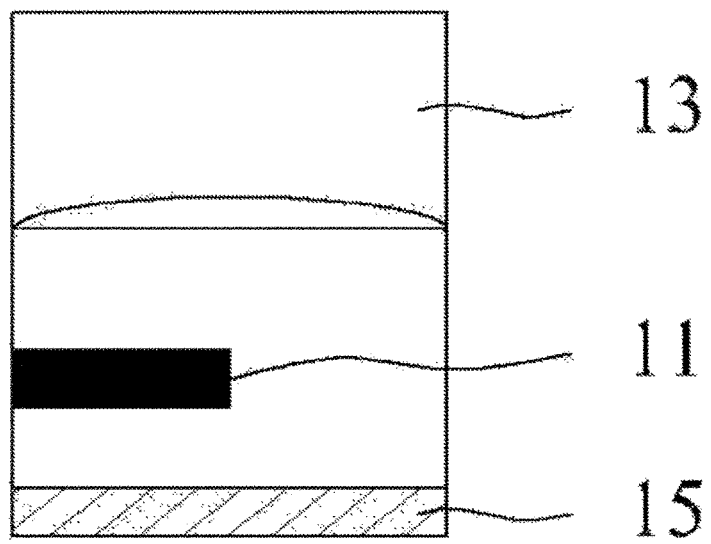
FIG. 2 is a schematic diagram of a structure of a phase difference detection pixel.

FIG. 2 is a schematic diagram of a structure of a phase difference detection pixel.

Referring to FIG. 2, the phase difference detection pixel may include a mask layer 11, a microlens 13, and a photodiode 15.

The mask layer 11 may form a shield region in the phase difference detection pixel 10. The mask layer 11 may be embodied as a metal mask and may be divided into an opening portion on which light is incident through the mask layer 11 and a shield region for shielding light. For example, an amount of light incident on the photodiode 15 may be adjusted according to an area shielded by the mask layer 11.

According to a shape of the mask layer 11, a shape of a shielded area of the opening portion may be changed.

The microlens 13 may concentrate an incident optical signal on a central portion of the phase difference detection pixel and transmit the signal to the photodiode 15. The microlens 13 may change a relative location with respect to the photodiode 15 in order to concentrate the incident optical signal.

The photodiode 15 may convert the incident optical signal into an electrical signal.

The image sensor 100A according to the embodiment illustrated in FIG. 1 may include the plurality of phase difference detection pixels and the plurality of image detection pixels 50 that are arranged in a lattice pattern.

Figure 3:
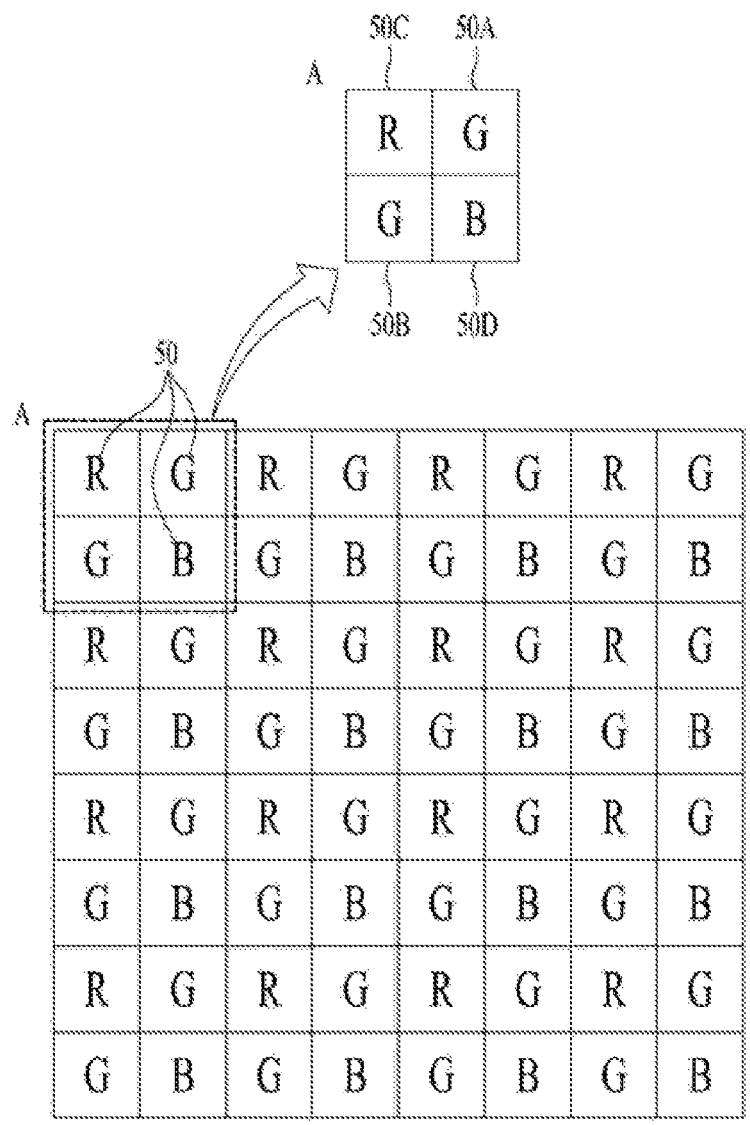
FIG. 3 is a diagram showing an embodiment of the plurality of image detection pixels.

FIG. 3 is a diagram showing an embodiment of the plurality of image detection pixels 50.

The image detection pixels 50 may be arranged in a lattice pattern along a plurality of phase difference detection pixels and the lattice pattern may include at least one lattice unit A.

The image sensor 100A may convert an optical signal that is externally input and transmitted thereto into an electrical signal to output image information and may also convert image information from an input analog image signal into digital data. An image sensor including a color pixel may calculate color information from the input optical signal.

For example, referring to FIG. 3, the image detection pixels 50 may be color pixels, the plurality of image detection pixels 50 may constitute the lattice unit A, and the lattice unit A may be repeatedly arranged in a lattice pattern. When the image detection pixels 50 are acolor pixels, the image detection pixels 50 may include red, green, and blue pixels but a color pixel is not limited to the proposed colors.

In FIG. 3, R, G, and B denote red, green, and blue, respectively.

Referring to FIG. 3, the image detection pixels 50 of the image sensor may be configured in such a way that the lattice unit A with two rows and two columns is repeatedly arranged to constitute a lattice pattern.

Four pixels constituting the lattice unit A may include a first pixel 50A and a second pixel 50B that are two pixels facing each other in a first diagonal direction and a third pixel 50C and a fourth pixel 50D that are two pixels facing each other in a second diagonal direction that crosses the first diagonal direction.

The first and second pixels 50A and 50B of the lattice unit A may include a pixel G and the third and fourth pixels 50C and 50D as the two remaining pixels may include pixels R and B, respectively.

The lattice unit A may have a Bayer arrangement in which four pixels are arranged in two rows and two columns. The lattice unit A with a lattice pattern may be three rows and three columns or four rows and four columns but is not limited thereto and the lattice unit A may be configured in various configurations according to embodiments.

When the plurality of phase difference detection pixels is arranged in a lattice pattern along with the image detection pixels 50, the phase difference detection pixel may be arranged in a location of the first or second pixel 50A or 50B of the lattice unit A. For example, the phase difference detection pixel may be arranged at a location of a pixel G.

A lattice pattern containing the lattice unit A may have n rows and m columns. In this case, n and m are natural numbers and n and m may be the same or different.

Figure 4:
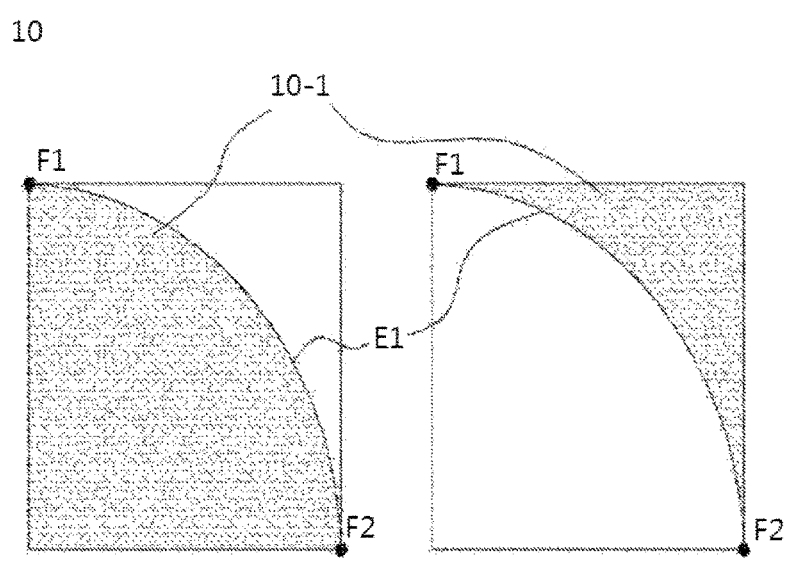
FIGS. 4 and 5 are diagrams showing an embodiment of a first pixel group.

FIG. 4 is a diagram showing an embodiment of the first pixel group 10 included in the plurality of phase difference detection pixels.

Referring to FIG. 4, the first pixel group 10 may have a shield region 10-1 biased toward one side based on a line E1 connecting two points F1 and F2 that face each other in a diagonal direction in a pixel.

For example, the two points F1 and F2 facing in a diagonal direction in the first pixel group 10 may be two vertices facing in a diagonal direction in a pixel but are not limited thereto and the two points F1 and F2 may include two points when a line connecting two facing points is not a vertical or horizontal line.

The line E1 for defining a shield region in the first pixel group 10 may be a curved line. For example, the line defining the shield region may be the line E1 that is convex toward an upper end surface based on a virtual straight line connecting the two facing points F1 and F2 or a line E2 that is convex toward a lower end surface based on a straight line but a shape of the line is not limited thereto.

Referring to FIG. 1, the first pixel group 10 may include a first group pixel 10A having a first shield region biased toward a central side of the image sensor based on a line defining a shield region and a second group pixel 10B having a second shield region biased toward an edge portion of the image sensor based on a line defining a shield region.

That is, the first group pixel 10A and the second group pixel 10B included in the first pixel group 10 may be distinguished according to a relative position at which a shield region biased toward one side is arranged in the image sensor.

Figure 5:
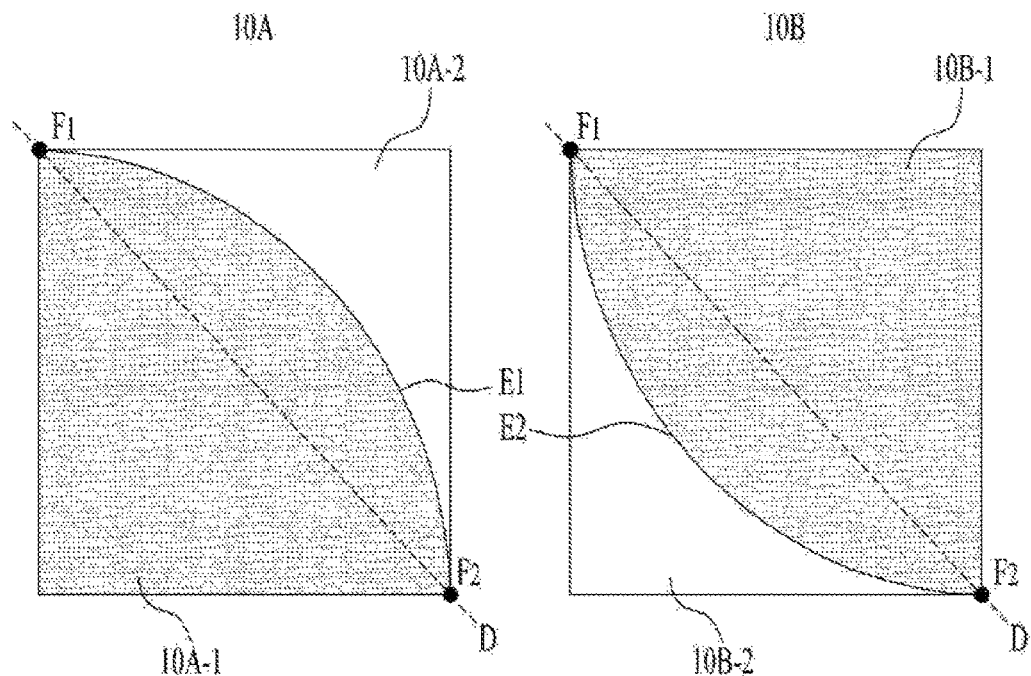

FIG. 5 is a diagram showing an embodiment of a first pixel group and illustrates an embodiment of the first group pixel 10A and the second group pixel 10B included in the first pixel group contained in a region Ax of FIG. 1.

Referring to the embodiment of the first pixel group of FIG. 5, a first shield region 10A-1 of the first group pixel 10A and a second shield region 10B-1 of the second group pixel 10B may be arranged symmetrically.

For example, comparing the first group pixel 10A and the second group pixel 10B, the first shield region 10A-1 may be symmetrical to the second shield region 10B-1 based on a diagonal line D between the first shield region 10A-1 and the second shield region 10B-1.

When a line defining a shield region of the first group pixel 10A is referred to as a first line E1 and a line defining a shield region of the second group pixel 10B is referred to as a second line E2, for example, the second line E2 of the second group pixel 10B may be symmetrical to the first line E1 of the first group pixel 10A based on the diagonal line D connecting two points facing each other in a diagonal direction in the second group pixel 10B and the first shield region 10A-1 of the first group pixel 10A and the second shield region 10B-1 of the second group pixel 10B that are defined and shielded by the first line E1 and the second E2 may be symmetrically arranged.

In the embodiment of FIG. 1, the first group pixel 10A and the second group pixel 10B may be arranged neighbored to each other and, for example, the first group pixel 10A and the second group pixel 10B may be may be arranged neighbored to each other in a diagonal direction in the image sensor.

In the image sensor 100A of FIG. 1, the first pixel group 10A may be arranged in the lattice units A1, A2, and Ax on the diagonal lines D1 and D2.

For example, the first pixel group 10A and 10B may be arranged in a pixel G including a virtual diagonal line D1 or D2 passing through the center of the image sensor 100A.

In this case, the first group pixel 10A with a shield region biased toward the center of the image sensor and the second group pixel 10B with a shield region biased toward an edge portion of the image sensor may be arranged neighbored to each other in a pixel G of one lattice unit and may be arranged neighbored to each other in pixels G of neighboring lattice units.

Referring to FIG. 1, the shield region of the first group pixel 10A may be a region adjacent to the center of the image based on the first line connecting two lines facing in a diagonal direction of the first group pixel 10A.

The first pixel group 10 arranged in the image sensor 100A according to the embodiment may be arranged at an interval of four pixels in the diagonal direction of the image sensor.

For example, three pixels that are adjacent in a diagonal direction may be arranged between pixels, shield regions of which have the same direction, in the first pixel group 10.

In addition, pixels, shield regions of which have the same direction, in the first pixel group 10 may have an interval corresponding to 4 to 16 pixels in lattice units arranged in the diagonal direction of the image sensor.

When pixels of the first pixel group, shield regions of which have the same direction, is arranged more closely than an interval corresponding to four pixels, an interval at which phase difference detection pixels are arranged may be narrowed and, thus, a brightness value of optical information emitted through the image sensor may be too low to process an image. On the other hand, when the first pixel group 10 is arranged at an interval corresponding to 16 pixels or more, there is a problem in that the number of pixels for acquisition of information for detecting a phase difference is reduced, degrading performance.

Figure 6:
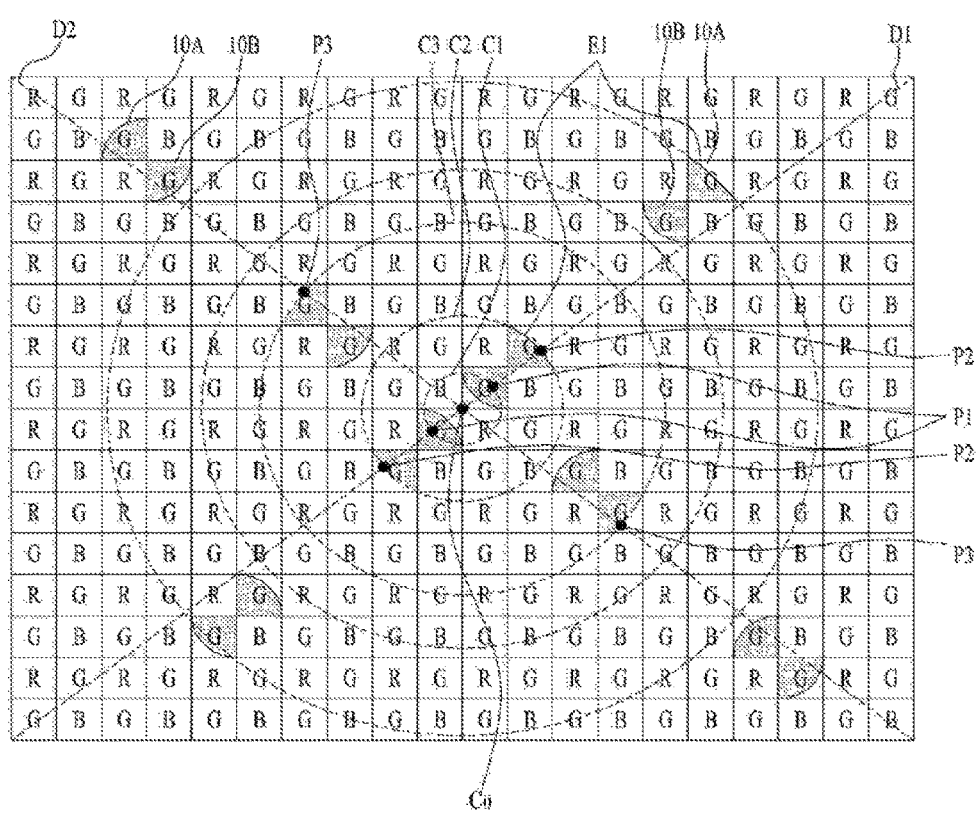
FIG. 6 is a diagram showing another embodiment of an image sensor.

FIG. 6 is a diagram showing another embodiment of an image sensor.

In the embodiment of FIG. 6, the first pixel group 10A and 10B may be arranged in lattice units containing points P1, P2, P3 . . . at intersections between the diagonal line D1 or D2 of the image sensor and virtual concentric circles C1, C2, C3 . . . based on a central region C0 of the image sensor 100B.

In the embodiment shown in FIG. 6, the first line E1 for defining the shield region of the first group pixel 10A may correspond to a portion of a circumference of a virtual concentric circle.

For example, in FIG. 6, the line E1 for defining the shield region in the first group pixel 10A containing the point P2 may overlap a portion of a circumference of the virtual circle C2.

That is, a radius of curvature of the first line E1 for defining the shield region of the first group pixel 10A may correspond to a radius of a concentric circle based on a central region C0 of an image sensor.

The radius of curvature of the virtual concentric circle based on the central region C0 of the image sensor may be increased toward an edge from the center of the image sensor.

The virtual concentric circle based on the central region C0 of the image sensor 100B illustrated in FIG. 6 may define an optical field.

Figure 7:
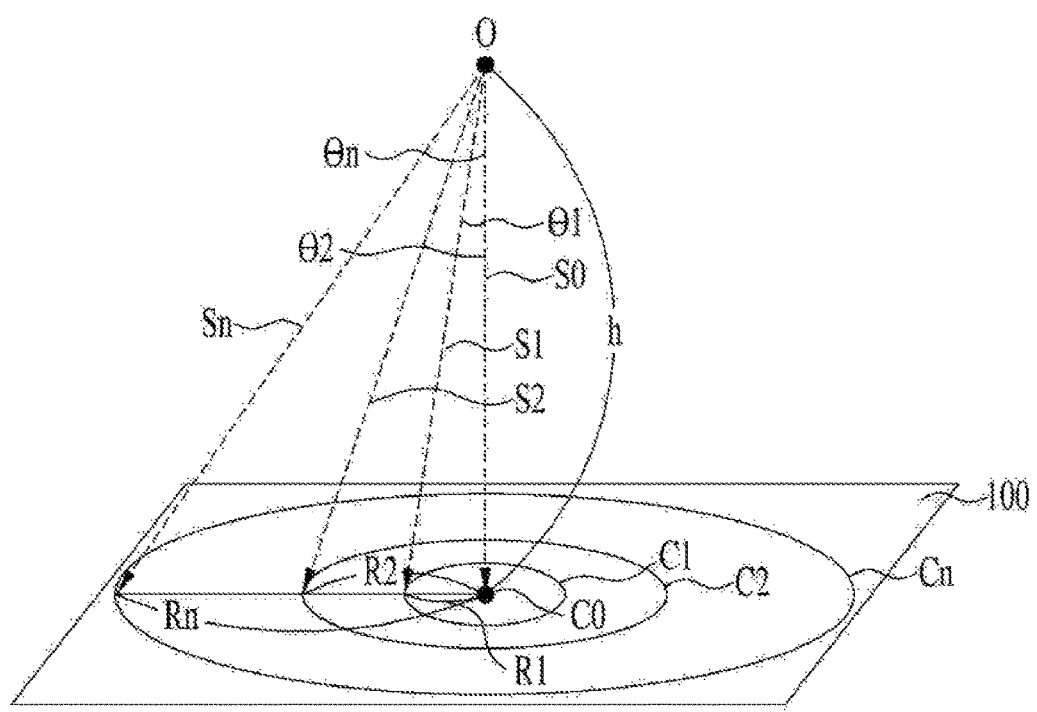
FIG. 7 is a schematic diagram of an optical field in which a region of an image sensor with light incident thereon is randomly divided.

FIG. 7 is a schematic diagram of an optical field in which a region of an image sensor 100 with light incident thereon is randomly divided.

In FIG. 7, the optical field may be divided based on an optical center O of incident light with respect to light incident on the image sensor 100. In this case, virtual lines S1, S2, . . . Sn for defining the optical field may have a predetermined angle with respect to a line S0 that passes through a central region C0 of the image sensor.

In FIG. 7, a first optical field may be a region to a point corresponding to an intersection between the image sensor and a virtual line S1 with an angle of $\theta 1$ to one side based on the line S0 that passes through the central region C0 of the image sensor in the optical center O.

For example, when a distance to the point corresponding to an intersection between the image sensor and the line S1 from the central region C0 of the image sensor is R1, the first optical field may be an internal region of a circle C1 with radius R1.

Then, a second optical field may be a region to a point corresponding to an intersection between the image sensor and the virtual line S2 with an angle of $\theta 2$ based on S0 and, for example, the second optical field may be a region to a circle C2 with R2 as a radius from C1.

When an angle of S2 is $\theta 2$ based on an angle of incidence of light for dividing the second optical field, i.e., S0, $\theta 2 = 2*\theta 1$ may be satisfied.

An angle of incidence of light for defining an $n^{th}$ optical field may be $\theta n = n*\theta 1$, where n is a natural number equal to or greater than 1.

An angle of incidence of light incident on the image sensor 100 may be the same as an angle of view of a lens that provides optical information to the image sensor.

For example, when an angle of view of a lens is 80°, an image sensor is divided into n optical fields, an angle of incidence of light for defining a first optical field may be $\theta 1 = 80°/2n$. That is, when a region of the image sensor is divided into 10 optical fields, $\theta 1 = 4°$, $\theta 2 = 8°$, and $\theta 10 = 40°$.

Concentric circles C1, C2, and Cn for defining an optical field region in FIG. 7 may correspond to virtual concentric circles C1, C2, and C3 in the image sensor of FIG. 6.

In the image sensor 100B of FIG. 6, a radius of curvature of the first line E1 of the first group pixel 10A may be increased toward an edge from a center of the image sensor.

For example, a radius of a virtual concentric circle based on the central region C0 of the image sensor may be increased toward an edge from the central region C0 of the image sensor and, accordingly, in the case of a pixel having the first line E1 corresponding to a portion of a circumference of the concentric circle in the first group pixel 10A, a radius of curvature of the first line E1 may be increased as a location of the pixel arranged in the image sensor 100B is arranged toward an edge.

Figure 8:
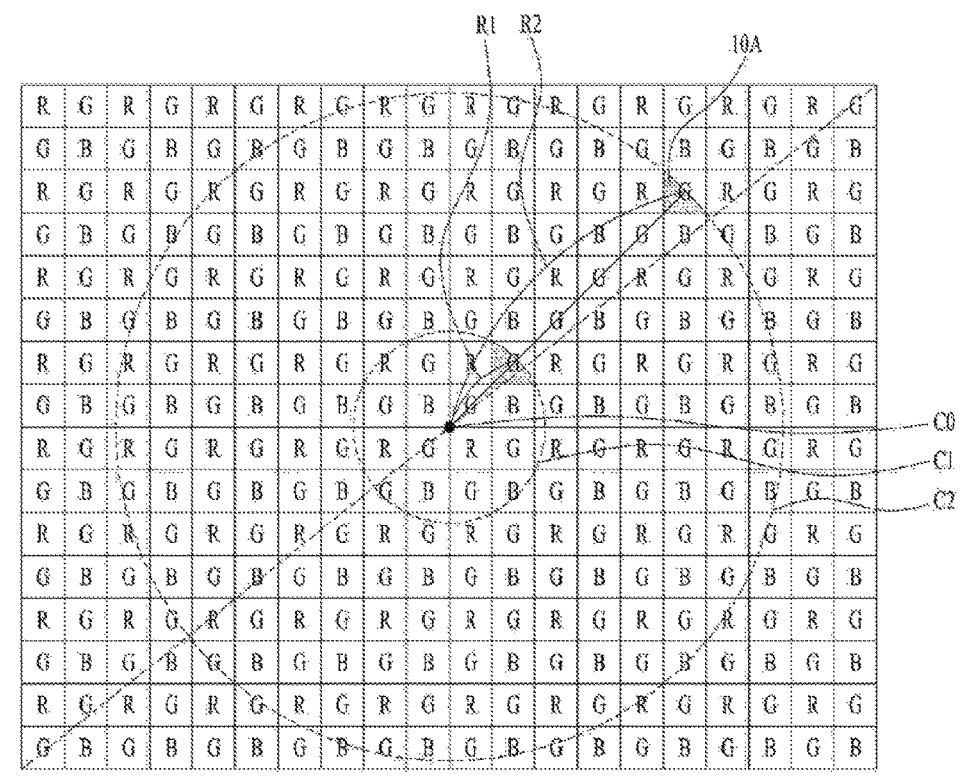

FIG. 8 is a diagram showing a radius of curvature of the first group pixel 10A included in the image sensor 100B shown in FIG. 6.

Referring to FIG. 8, as the central region C0 of the image sensor is arranged outward, a radius of curvature of the first line defining the shield region of the first group pixel 10A included in the first pixel group 10 may be increased.

For example, when the radius of curvature of the first group pixel 10A adjacent to the central region C0 of the image sensor is R1 and a radius of curvature of the first group pixel 10A arranged at an outer region of the image sensor than the former case is R2, R2>R1 may be satisfied.

Figure 9A:
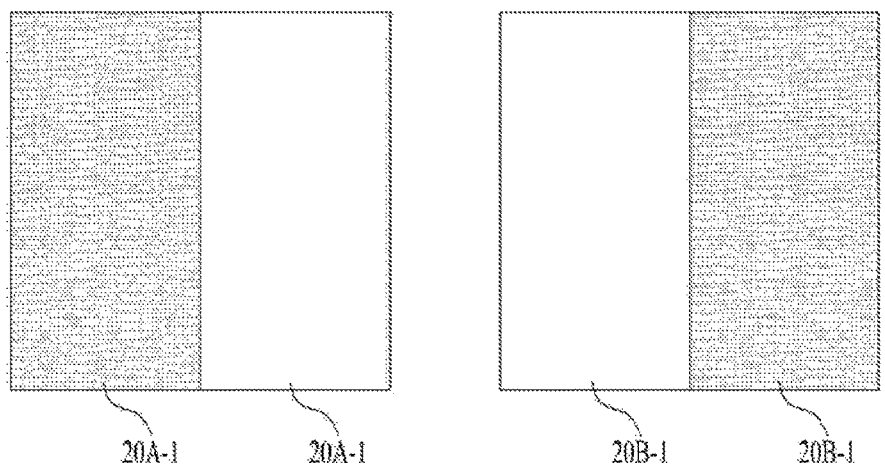
FIGS. 9A to 9B are diagrams showing a second pixel group and a third pixel group as another embodiment of a plurality of phase difference detection pixels.
Figure 9B:
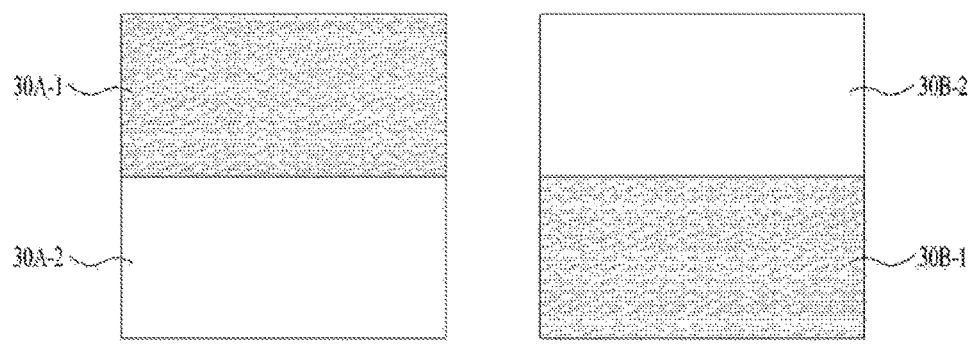

FIGS. 9A to 9B are diagrams showing a second pixel group 20 and a third pixel group 30 as another embodiment of a plurality of phase difference detection pixels.

The plurality of phase difference detection pixels may include the second pixel group 20 having a shield region biased toward one side by vertically dividing a pixel and the third pixel group 30 having a shield region biased toward one side by horizontally dividing the pixel.

In FIG. 9A, the second pixel group 20 may include a pixel group 20A having a shield region 20A-1 biased toward a left side and a pixel group 20B having a shield region 20B-1 biased toward a right side.

In addition, in FIG. 9B, the third pixel group 30 may include a pixel group 30A having a shield region 30A-1 biased toward an upper portion of a pixel and a pixel group 30B having a shield region 30B-1 biased toward a lower portion of a shield region.

Shield regions of one pair of phase difference detection pixels (a pair of 20A and 20B and a pair of 30A and 30B) having shield regions biased in opposite directions in the second pixel group 20 and the third pixel group 30 may have the same area or different areas.

For example, a ratio of an area of a shield region of a phase difference detection pixel may be changed according to a relative arrangement position in the image sensor and a ratio of an area of each of the shield regions 20A-1 and 20B-1 biased in opposite directions in the second pixel group 20 may have a range of 3:7 to 7:3.

In the third pixel group 30, 30A-1: 30B-1 as a ratio of an area of each of shield regions biased in opposite directions may also be 3:7 to 7:3.

As the second pixel group 20 is arranged toward a central region of the image sensor, areas of the shield regions 20A-1 and 20B-1 biased in opposite directions of the pixel groups 20A and 20B included in the second pixel group 20 may be the same.

With respect to the pixel groups 30A and 30B including the third pixel group 30, the pixel groups 30A and 30B are arranged toward a center of the image sensor, areas of the shield regions 30A-1 and 30B-1 may be the same.

Figure 10:
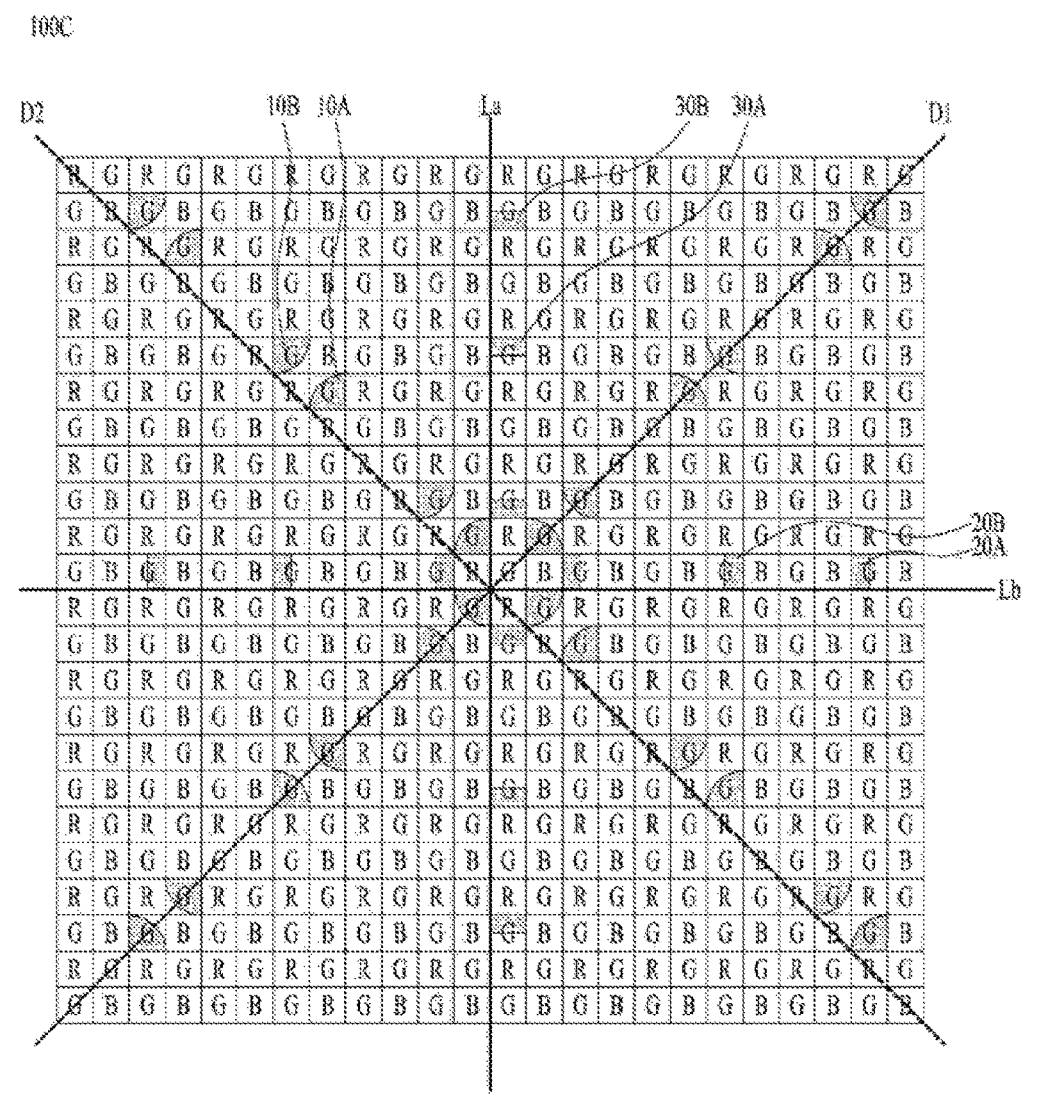

FIG. 10 is a diagram showing another embodiment of an image sensor.

Referring to FIG. 10, the second pixel groups 20A and 20B may be arranged in a row direction in the image sensor 100C.

The phase difference detection pixels 20A and 20B of the second pixel group have a shield region shielded in a region defined by vertically dividing a pixel and, thus, a phase difference of optical information of light incident on an object in right and left directions may be defined with high accuracy. Accordingly, when the second pixel groups 20A and 20B are arranged in a row direction in the image sensor, a phase difference may be advantageously detected.

In addition, in the embodiment of FIG. 10, the third pixel groups 30A and 30B may be arranged in a column direction in the image sensor 100C.

The phase difference detection pixels 30A and 30B of the third pixel group may detect a phase difference of optical information of light incident in upper and lower directions with respect to an object with high accuracy and, thus, when the phase difference detection pixels 30A and 30B are arranged in a column direction in the image sensor, a phase difference may be adjacently detected.

Referring to the embodiment of the image sensor 100C shown in FIG. 10, the first pixel group 10A and 10B may be arranged in a lattice unit on the diagonal line D1 or D2 of the image sensor in the image sensor 100C, the second pixel groups 20A and 20B may be arranged in a row direction in a lattice unit adjacent a horizontal line Lb passing through a center of the image sensor, and the third pixel groups 30A and 30B may be arranged in a column direction in a lattice unit adjacent a vertical line La passing through the center of the image sensor.

In this case, the first group pixel 10A included in the first pixel group and the second group pixel 10B having a shield region that is symmetrical with the first group pixel 10A may be arranged neighbored to each other and, for example, the first group pixel 10A and the second group pixel 10B may be arranged neighbored to each other in the diagonal direction in the image sensor.

Figure 11A:
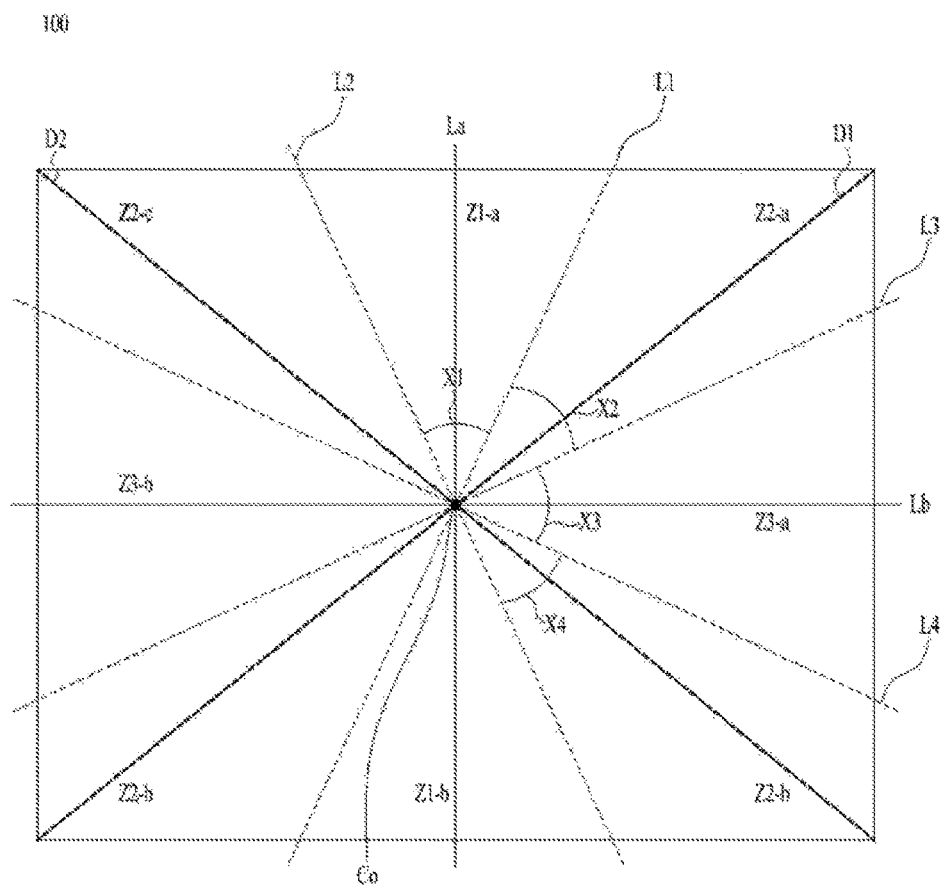
FIGS. 11A and 11B are diagrams showing another embodiment of an image sensor.

FIG. 11A is a diagram showing the case in which an image sensor is divided into a plurality of regions.

Referring to FIG. 11A, the image sensor 100 may include a plurality of regions defined by four lines L1, L2, L3, and L4 passing through a center.

Acute angles formed by two neighboring lines among four lines L1, L2, L3, and L4 for defining a region of the image sensor 100 may be the same in a plurality of regions.

Referring to FIG. 11A, a region Z1-*a* formed at an angle X1 between lines L1 and L2 passing a center of the image sensor 100 may face a region Z1-*b* based on the central region C0 of the image sensor and an angle in the region Z1-*b* may also be X1.

Similarly, regions Z2-*a* and Z2-*b* may face each other at an angle of X2, regions Z2-*c* and Z2-*d* may face each other an angle of X4, and regions Z3-*a* and Z3-*b* may face each other at an angle of X3.

The regions Z1-*a* and Z1-*b* among a plurality of regions of the image sensor 100 shown in FIG. 11A may contain a virtual vertical line LA passing through the central region C0 of the image sensor, the regions Z2-*a*, Z2-*b*, Z2-*c*, and Z2-*d* may contain a virtual diagonal line D1 or D2 passing through the central region C0 of the image sensor, and the regions Z3-*a* and Z3-*b* may contain a virtual horizontal line Lb passing through the central region C0 of the image sensor.

For example, the number of the plurality of regions contained in the image sensor 100 may be eight and X1 to X4 as angles between two adjacent straight lines may be the same, that is, 45°.

Figure 11B:
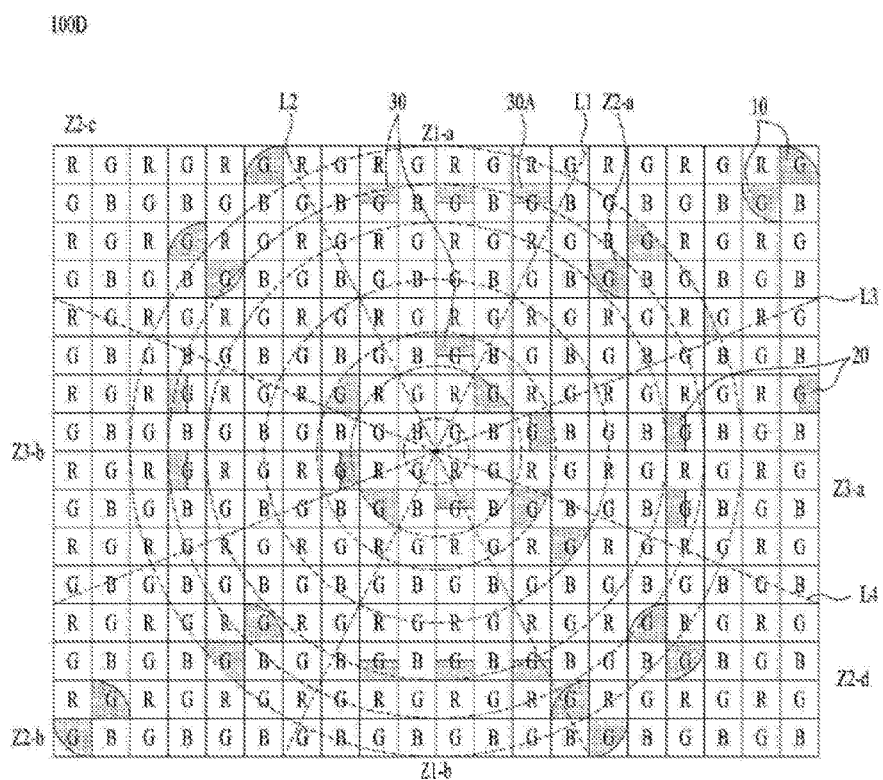

FIG. 11B is a diagram illustrating an embodiment of an image sensor when an image sensor is divided into a plurality of regions as shown in FIG. 11A.

In the embodiment of an image sensor 100D shown in FIG. 11B, a plurality of regions defined by four lines may include any one selected from the group consisting of the first pixel group 10, the second pixel group 20, and the third pixel group 30.

In this case, pixel groups with the same phase difference may be arranged in regions facing each other based on a center of the image sensor.

For example, the third pixel group 30 may be arranged in the regions Z1-*a* and Z1-*b* that contain a virtual vertical line passing through the center of the image sensor and face each other. In addition, the first pixel group 10 may be arranged in the regions Z2-*a* to Z2-*d* containing a virtual diagonal line passing through the image sensor and the second pixel group 20 may be arranged in the regions Z3-*a* and Z3-*b* containing a virtual horizontal line passing through the center of the image sensor.

In the phase difference detection pixel of the first pixel group 10 included in the aforementioned embodiment, a ratio of a shield region to an entire area of the phase difference detection pixel may have a value of 0.5 to 0.7.

For example, referring back to FIG. 4, in the first pixel group, a relationship of (area of region 10-1):(entire area of region 10)=0.5 to 0.7:1 may be obtained.

There is a problem in that, when a ratio of an area of a shield region of an entire area of a pixel is less than 0.5, accuracy of detection of a phase difference from an image acquired from a pair of phase difference pixel groups may be lowered and, when the ratio is greater than 0.7, an amount of light shielded and transmitted by a shield region may be remarkably reduced, lowering a brightness value of image information.

Figure 12A:
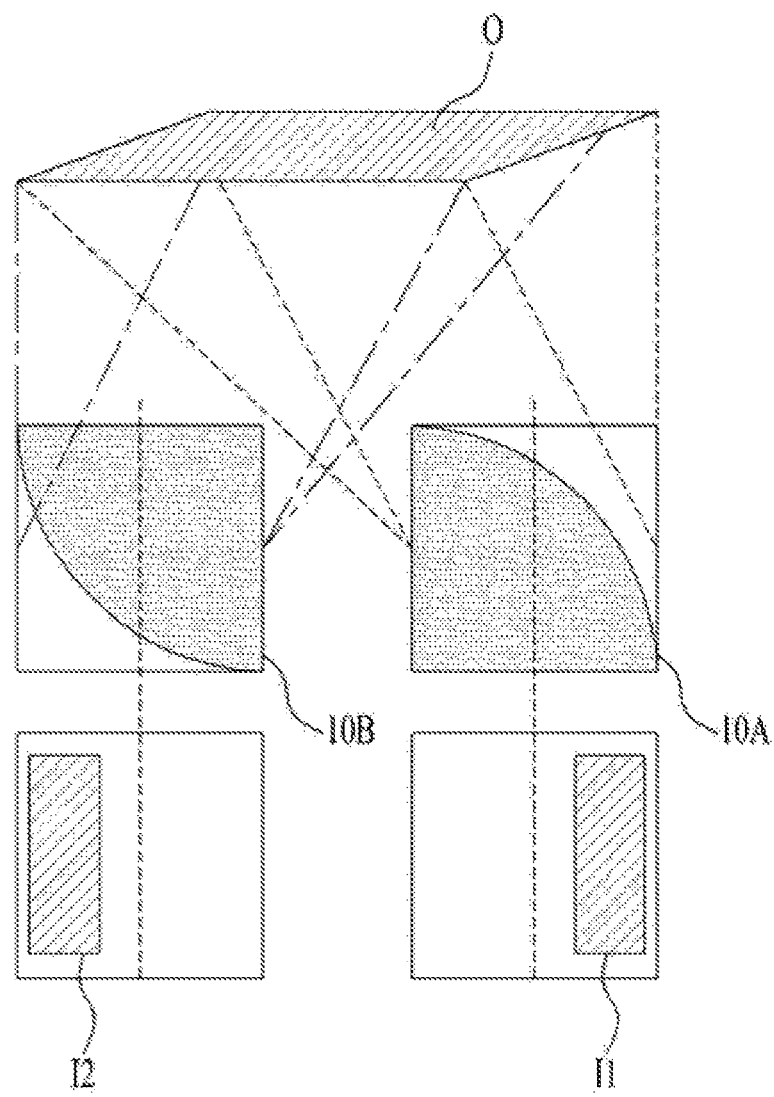
FIGS. 12A to 12B are diagrams showing an embodiment of a method of detecting a phase difference in a first pixel group.

FIG. 12A are 12B are schematic diagrams showing a relationship between a ratio of a shield region to the first pixel group 10A and 10B and detection of a phase difference.

FIG. 12A shows the case in which a ratio of an area of a shield region to the first pixel group 10A and 10B is greater than 0.5 and, in this case, since images I1 and I2 as image information on an object O acquired from the first group pixel 10A and the second group pixel 10B are biased toward one side, two images do not overlap each other and, thus, it may be easy to detect a phase difference.

Figure 12B:
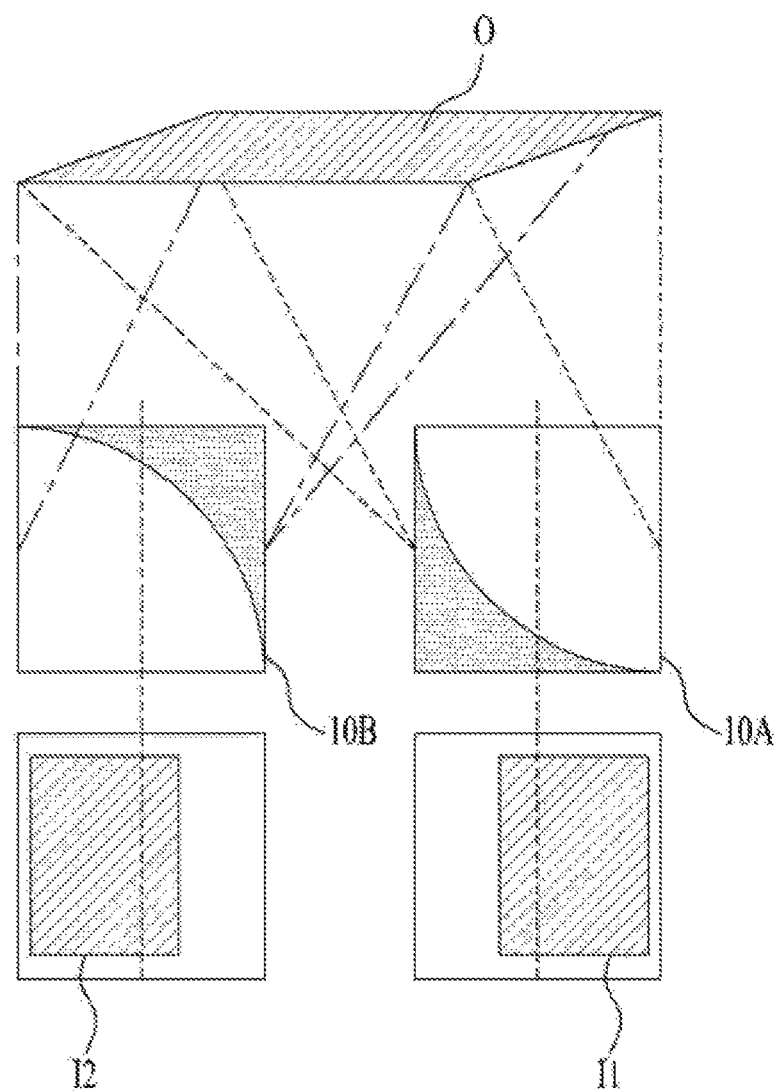

On the other hand, FIG. 12B shows the case in which a ratio of an area of a shield region to the first pixel group 10A and 10B is less than 0.5 and, in this case, since images I1 and I2 as image information on the object O acquired from the first group pixel 10A and the second group pixel 10B partially overlap, there is a problem in that an accurate phase difference value is not capable of being acquired during detection of a phase difference from information of the two images.

Although the embodiment of the image sensor has been described with reference to the drawings thus far, the number of pixels included in the image sensor is not limited to the drawings. In addition, an interval at which the plurality of phase difference detection pixels are arranged in the image sensor or a region in which the first to third pixel groups constituting the phase difference detection pixel are arranged may be changed according to required image information.

The image sensors 100A, 100B, 100C, and 100D according to the aforementioned embodiment may have characteristics in that a plurality of phase difference pixel groups with different shapes of shield regions formed in the phase difference detection pixel is arranged and, in particular, the first pixel group in which a shield region is divided based on a line connecting two points that face each other may be arranged in a diagonal region of the image sensor and, thus, it may be easy to detect a phase difference in the diagonal region.

In addition, the image sensor may be divided and the phase difference detection pixels of the first to third pixel groups may be selective arranged and, thus, in the case of the image sensors 100A, 100B, 100C, and 100D according to the embodiment, an accurate phase difference may be detected from input optical information irrespective of a region of the image sensor and, accordingly, auto focus performance may be enhanced.

Although an imaging device containing the aforementioned image sensors 100A, 100B, 100C, and 100D will be described with reference to the accompanying drawings, embodiments are not limited thereto. That is, the aforementioned image sensors 100A, 100B, 100C, and 100D may be used in various ways.

Figure 13:
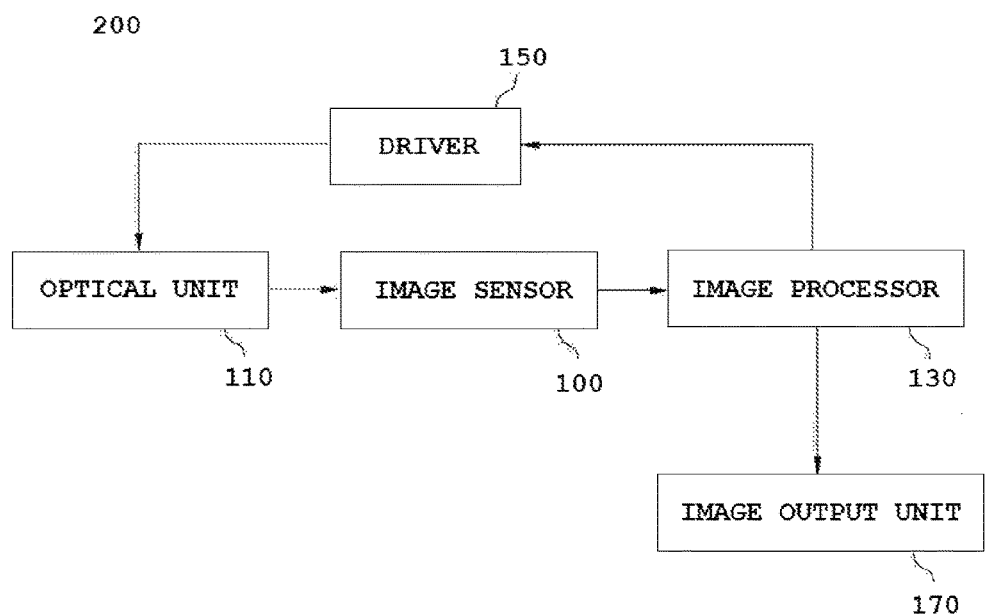
FIG. 13 is a block diagram showing a schematic configuration of an image pick-up apparatus according to an embodiment.

FIG. 13 is a block diagram showing a schematic configuration of an image pick-up apparatus 200 according to an embodiment.

The image pick-up apparatus 200 shown in FIG. 13 may include an optical unit 110, the image sensor 100, an image processor 130, and an image output unit 170.

The optical unit 110 may include a lens and a lens driver and receive an external optical signal.

For example, the optical unit 110 may absorb light emitted from an external source and output the light to the image sensor 100 in order to acquire an image of an object.

The optical unit 110 may include a plurality of lenses and include a focus lens, a zoom lens, or the like, and locations of the plurality of lenses may be adjusted by a lens driver.

Optical information output from the optical unit 110 may be transmitted to the image sensor 100.

The image sensor 100 may be any one of the image sensors 100A, 100B, 100C, and 100D according to the aforementioned embodiment, may receive optical information of an object, received from the lens of the optical unit 110, and may photoelectrical-convert the optical information into an electrical signal. The image sensor 100 may be a charge-coupled device (CCD) sensor or a complementary metal-oxide-semiconductor (CMOS) sensor.

The image processor 130 may generate image information on the electrical signal supplied from the image sensor 100, supply the generated image information to the image output unit 170, and allow the image output unit 17 to display an image of an object.

For example, the image processor 130 may generate image information of a captured image from an electrical signal of the image detection pixels 50 supplied from an image sensor 100 and generate image information for adjustment of a focal point based on the electrical signal of the phase difference detection pixels 10, 20, and 30.

In addition, the image processor 130 may acquire information for writing a depth map as well as planar image information from the electrical signals of the supplied phase difference detection pixels 10, 20, and 30. Stereoscopic image information as well as planar image information may be calculated from the information of the depth map.

The embodiment of the image pick-up apparatus 200 may include a driver 150 for controlling the optical unit 110 in response to image information processed by the image processor 130.

The image processor 130 may determine whether the optical unit 110 needs to be moved may be determined in order to match a focal point from the generated image information for adjustment of a focal point and, when it is determined that the optical unit 110 needs to be moved, the image processor 130 may output a signal for controlling the optical unit 110 to be moved.

For example, the image processor 130 may further include a controller (not shown) for determining image information processed from the signal supplied from the image sensor 100 and controlling driving of the image pick-up apparatus 200.

The controller (not shown) may control an overall operation of the image pick-up apparatus 200 and activate the image processor 130 and the driver 150 for driving the optical unit 110.

The controller (not shown) may control an optical signal input by controlling the optical unit 110, convert the input optical signal into an electrical signal and transmit the electrical signal to the image processor 130 through the image sensor 100, and calculate a phase difference value from the image information for adjustment of a focal point that is processed and output by the image processor 130.

The image processor 130 may calculate a movement amount of the optical unit 110, which is required for AF adjustment of detection of a phase difference, from the calculated phase difference value. The calculated information of the movement amount of the optical unit 110 may be transmitted to the driver 150 and, accordingly, the optical unit 110 may be adjusted to perform AF control of a detection method of a phase difference.

The image output unit 170 may display image information supplied from the image processor 130. The image output unit 170 may provide visual image information to a user and include a display unit including a liquid crystal display (LCD) panel, an organic light emitting diode (OLED) panel, or the like in order to display the image information.

The image pick-up apparatus 200 according to the embodiment may include the image sensors 100A, 100B, 100C, and 100D according to the aforementioned embodiment and, thus, a phase difference value may be easily detected from an entire area of the image sensor 100 irrespective of a location of the image sensor 100 that collects optical information or a shape of an object as an imaging target, thereby enhancing accuracy of focus adjustment.

Figure 14:
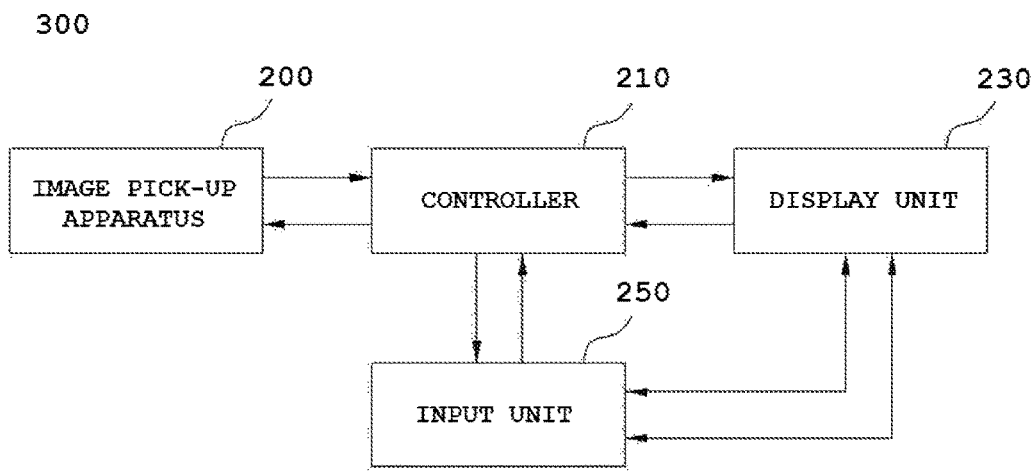
FIG. 14 is a block diagram of a schematic configuration of an embodiment of a portable terminal.

FIG. 14 is a block diagram of a schematic configuration of an embodiment of a portable terminal 300 including the image pick-up apparatus 200.

The embodiment of the portable terminal 300 may include the image pick-up apparatus 200 according to the aforementioned embodiment, a display unit 230 for displaying an image acquired from the image pick-up apparatus, and an input unit 250 for adjusting an operation of the image pick-up apparatus.

The portable terminal 300 may further include a controller 210 for transmitting information input from the image pick-up apparatus 200 and externally outputting the information or providing image information acquired from the image pick-up apparatus 200 to be used in other functions of a portable terminal.

The controller 210 may control an overall operation of the portable terminal 300.

For example, the controller 210 may control an operation of the image pick-up apparatus 200 or the display unit 230 according to the signal transmitted through the input unit 250.

The controller 210 may display and output the image information acquired by the image pick-up apparatus 200 via the display unit 230, store the image information acquired from the image pick-up apparatus 200 in an internal or external storage (not shown) of the portable terminal 300, or transmit the image information using a wireless communication method.

The display unit 230 may be a display device for allowing a user to check the image acquired from the image pick-up apparatus 200 and may be arranged in front of a portable terminal. The display unit 230 may include a liquid crystal display (LCD), an organic light emitting diode (OLED), or the like but is not limited thereto.

The input unit 250 may adjust an operation of the portable terminal 300 including the image pick-up apparatus 200 and the display unit 230 and the input unit 250 may include a touch input unit, a button input unit, or the like.

An information input method of the input unit 250 may include touch, tap, drag, gesture, or the like but a method of adjusting an operation of the portable terminal 300 may be used without any limitation.

The portable terminal 300 according to the embodiment may detect a phase difference and receive an image with a focus being adjusted via the image sensors 100A, 100B, 100C, and 100D including phase difference detection pixels with different shapes of shield regions and, thus, an image with high focus accuracy and high quality may be obtained.

Although the exemplary embodiments have been illustrated and described as above, it will of course be apparent to those skilled in the art that the embodiments are provided to assist understanding and the embodiments are not limited to the above description, and various modifications and variations can be made in the embodiments without departing from the spirit or scope of the disclosure, and the modifications and variations should not be understood individually from the viewpoint or scope of the disclosure so long as they include the constituent elements set forth in the claims.

INDUSTRIAL APPLICABILITY

The image sensor according to the embodiments may be configured in such a way that phase difference detection pixels, shield regions of which have different shapes, are optimally arranged and, thus, accuracy of detecting a phase difference in an entire region of an image sensor may be increased and auto focus may be easily adjusted in a desired region in an image pick-up apparatus.

The invention claimed is:

1. An image sensor comprising:
a plurality of phase difference detection pixels; and
a plurality of image detection pixels arranged in a lattice pattern along with the plurality of phase difference detection pixels,
wherein the plurality of phase difference detection pixels comprise a first pixel group having a shield region biased toward one side based on a line connecting two points facing each other in a diagonal direction.

2. The image sensor according to claim 1, wherein the first pixel group comprises:
a first group pixel having a first shield region biased toward a central side of the image sensor based on a line connecting the two points facing each other in the diagonal direction; and
a second group pixel having a second shield region biased toward an edge portion of the image sensor based on a line connecting the two points facing each other in the diagonal direction.

3. The image sensor according to claim 2, wherein the first shield region and the second shield region have the same area.

4. The image sensor according to claim 2, wherein the first group pixel and the second group pixel are arranged neighbored to each other, and wherein the first group and the second group pixel are arranged neighbored to each other in the diagonal direction of the image sensor.

5. The image sensor according to claim 2, wherein the line connecting the two points facing each other in the diagonal direction is a curved line.

6. The image sensor according to claim 5, wherein the curved line comprises:
a first line defining the first shield region of the first group pixel; and
a second line defining the second shield region of the second group pixel.

7. The image sensor according to claim 6, wherein the first line corresponds to a portion of a circumference of a virtual concentric circle based on a center of the image sensor, and wherein a radius of curvature of the virtual concentric circle is increased toward an edge from the center of the image sensor.

8. The image sensor according to claim 6, wherein the second line is symmetrical to the first line based on a diagonal line positioned between the first line and the second line and have the same radius of curvature as the first line.

9. The image sensor according to claim 1, wherein the lattice pattern comprises at least one lattice unit, and wherein the first pixel group is arranged in a lattice unit on a diagonal line of the image sensor.

10. The image sensor according to claim 9, wherein the first pixel group is arranged in a lattice unit containing a point corresponding to an intersection between a diagonal line of the images sensor and a virtual concentric circle based on the center of the image sensor.

11. The image sensor according to claim 9, wherein the lattice pattern comprises:
   first color and second color pixels facing each other in a first diagonal direction; and
   third color and fourth color pixels facing each other in a second diagonal direction that crosses the first diagonal direction, and wherein color of each of the first color and second color pixels is green.

12. The image sensor according to claim 11, wherein the plurality of phase difference detection pixels are arranged at locations of the first color and second color pixels.

13. The image sensor according to claim 9, wherein the plurality of phase difference detection pixels comprise at least one of:
   a second pixel group having a shield region biased toward one side by vertically dividing a pixel; and
   a third pixel group having a shield region biased toward one side by horizontally dividing a pixel, and wherein the second pixel group is arranged in a row direction of the image sensor, and wherein the third pixel group is arranged in a column direction of the image sensor.

14. The image sensor according to claim 13, wherein:
   the first pixel group is arranged in the lattice unit on a diagonal direction of the image sensor;
   the second pixel group is arranged in a row direction in the lattice unit adjacent to a horizontal line passing through the center of the image sensor; and
   the third pixel group is arranged in a column direction in the lattice unit adjacent to a vertical line passing through the center of the image sensor.

15. The image sensor according to claim 13, wherein:
   the image sensor comprises a plurality of regions defined by four lines passing through the center of the image sensor; and
   the plurality of regions comprises any one selected from the group comprising the first pixel group, the second pixel group, and the third pixel group.

16. The image sensor according to claim 13, wherein acute angles between two adjacent lines among the four lines are the same.

17. An image pick-up apparatus comprising:
   an optical unit configured to receive an optical signal;
   an image sensor comprises a plurality of phase difference direction pixels, and a plurality of image detection pixels arranged in a lattice pattern along with the plurality of phase difference detection pixels, wherein the plurality of phase difference detection pixels comprise a first pixel group having a shield region biased toward one side based on a line connecting two points facing each other in a diagonal direction, and wherein the image sensor generates image information from an optical signal received by the optical unit;
   an image processor configured to process the image information; and
   an image output unit configured to display a result of processing by the image processor.

18. The image pick-up apparatus according to claim 17, further comprising a driver configured to control the optical unit in response to the image information processed by the image processor.

19. The image pick-up apparatus according to claim 18, wherein the image information is image information for adjustment of a focal point, generated from the plurality of phase difference detection pixels of the image sensor.

20. A portable terminal comprising:
   an image pick-up apparatus comprises an optical unit configured to receive an optical signal, an image sensor, an image processor configured to process the image information, and an image output unit configured to display a result of processing by the image processor;
   a display unit configured to display an image acquired by the imaging apparatus; and
   an input unit configured to adjust an operation of the imaging apparatus
   wherein the image sensor includes a plurality of phase difference direction pixels, and a plurality of image detection pixels arranged in a lattice pattern along with the plurality of phase difference detection pixels,
   wherein the plurality of phase difference detection pixels comprise a first pixel group having a shield region biased toward one side based on a line connecting two points facing each other in a diagonal direction, and
   wherein the image sensor generates image information from an optical signal received by the optical unit.

* * * * *